C. F. SCHNUCK.
CLUTCH.
APPLICATION FILED DEC. 29, 1914.
1,182,589.
Patented May 9, 1916.
2 SHEETS—SHEET 2.
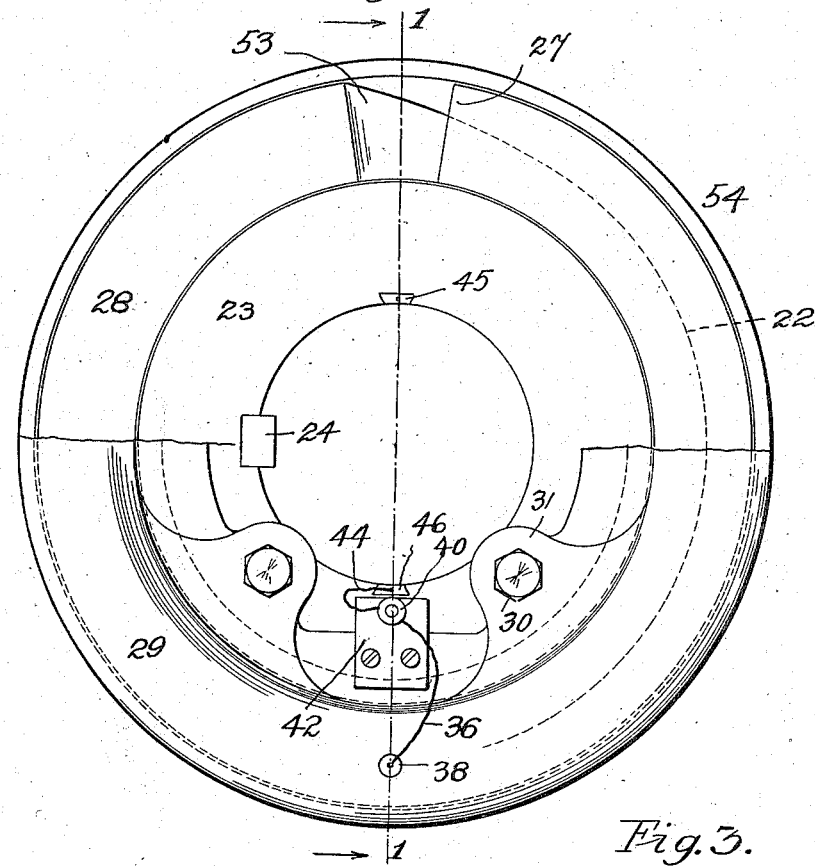
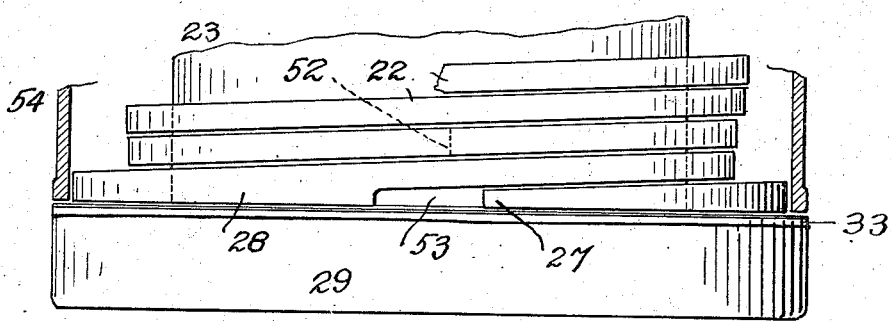

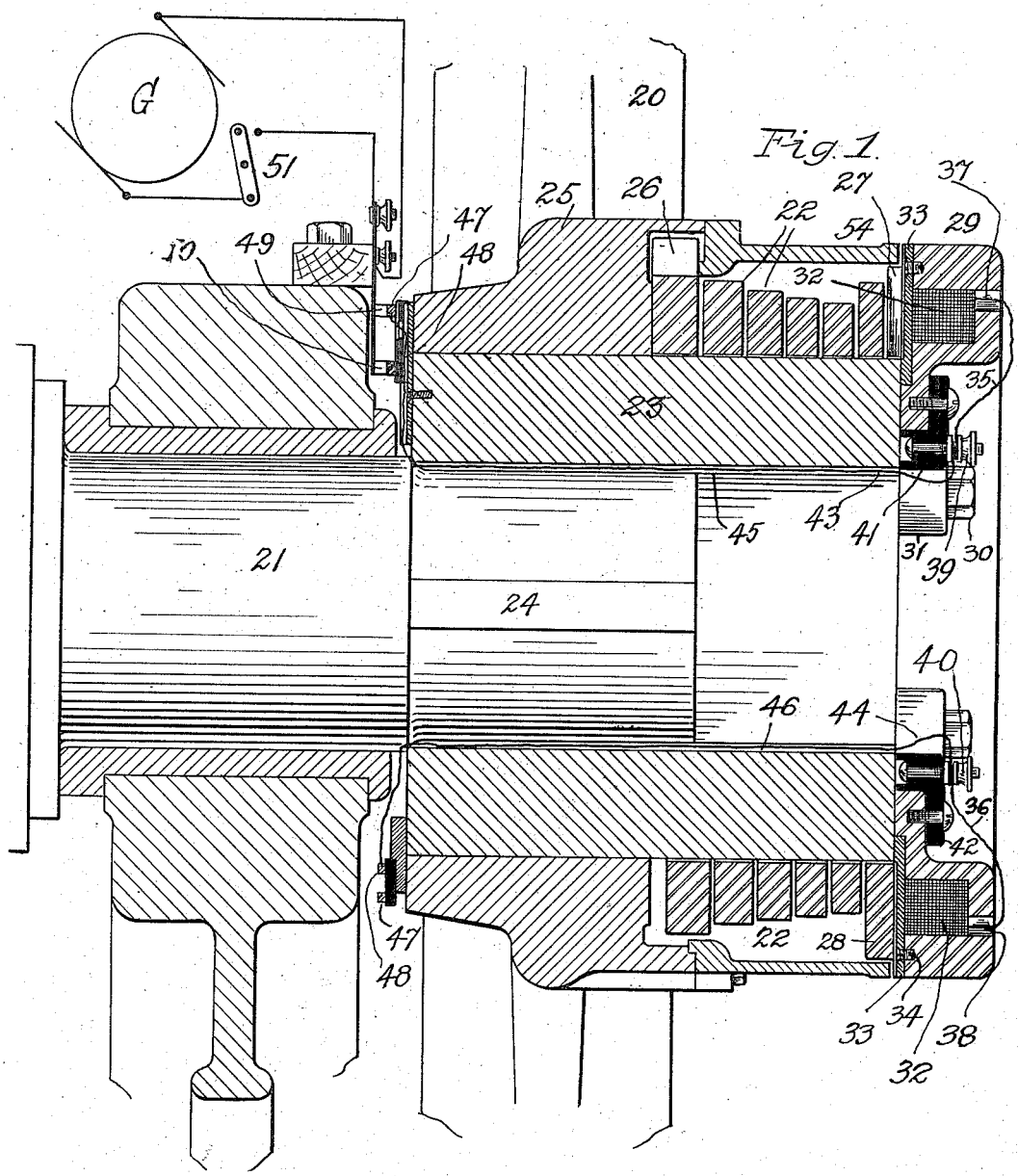

UNITED STATES PATENT OFFICE.

CARL F. SCHNUCK, OF ANSONIA, CONNECTICUT, ASSIGNOR TO FARREL FOUNDRY & MACHINE COMPANY, OF ANSONIA, CONNECTICUT, A CORPORATION OF CONNECTICUT.

CLUTCH.

1,182,589.  Specification of Letters Patent.  Patented May 9, 1916.

Application filed December 29, 1914. Serial No. 879,494.

*To all whom it may concern:*

Be it known that I, CARL F. SCHNUCK, a citizen of the United States, residing at Ansonia, in the county of New Haven and State of Connecticut, have invented certain new and useful Improvements in Clutches, of which the following is a full, clear, and exact description.

This invention relates to clutches, and more particularly to coil or strap clutches which are operated electromagnetically. Clutches of this type are commonly used for connecting electric and other prime movers to rubber mills, rolling mills, crushing and stamping machinery, and the like. In the operation of the clutch, the driving part and the driven part are coupled together by means of a steel or other coil, which is fixed relative to one of said parts, and arranged to be engaged and released relative to the other part by means of a suitable electromagnet.

Heretofore it has been proposed to construct a clutch wherein one of the members, for instance the driving member, carries a coil which is adapted to be frictionally engaged with the other (driven) member, by means of an electromagnet which locks the free end or tail of the coil to the driven member and thereby retards such free end or tail. Thus sufficient torsion is exerted upon the coil to cause it to frictionally engage the driven member and drive the same. The electromagnet has been directly carried by the driven member proper, and a special disklike armature, or engaging member, has been keyed to one end of the friction coil to cooperate with the magnet. In this construction the armature or engaging member is held out of engagement with the magnet, when the clutch is disengaged, by special means which are embodied in the clutch construction for that purpose, but when the clutch is to be engaged, said armature or engaging member is moved into full contact or engagement with a part of the magnet.

One of the primary objects of my invention is to furnish a clutch in which a special engaging member or armature is dispensed with, and wherein a part of the friction coil is adapted to act as an armature, while nevertheless, it retains at least to a certain degree, its normal function of frictionally engaging the driven member to assist in driving the same. By this change, the construction of the clutch is considerably simplified and improved. In certain aspects of the invention, however, this is not a material feature.

Another object which I have in view is to furnish a clutch in which no special means are necessary for holding the armature out of contact with the magnet when the clutch is disengaged, and in which the armature may retain substantially the same position axially of the magnet, when the clutch is disengaged, that it occupies when the clutch is engaged.

Another improvement which I have in view is the provision of means for preventing the locking or gripping together of the armature and magnet by residual magnetism when the current has been cut off. This is an objection of some moment which exists, for example, where there is steel to steel contact between the magnet and armature in the driving position, because in this case it is often difficult or impossible to disengage the clutch parts. I overcome this disadvantage, however, by providing means for preventing actual contact between the armature and the magnet in the driving position of the parts, as well as in the free, or disengaged, position. This means for limiting the movement of the armature toward the magnet proper, or the movement of the magnet proper toward the armature, will preferably be constituted by a strip of brass, or other non-magnetic material, permanently interposed between the armature and the magnet, but in the broad aspects of the invention, the particular construction is immaterial.

I also have in view the general improvement of the construction and operation of devices of the class to which my invention relates.

To these and other ends, the invention consists in the novel features and combinations of parts to be hereinafter described and claimed.

In the accompanying drawings, Figure 1 is a somewhat diagrammatic longitudinal section of a clutch embodying my improvements, taken on line 1—1 of Fig. 2; Fig. 2 is an end elevation of the clutch, with certain parts broken away; and Fig. 3 is a plan view of one end portion of the clutch, with the casing shown in section.

I have shown my improvements applied to a clutch for coupling a continuously rotating gear wheel or pulley 20 to a driven shaft 21, but this is not an essential feature. I have also shown my improvements as applied to a clutch wherein the continuously rotating member carries a helical friction coil 22, which rotates therewith, and is adapted to be brought into frictional contact with a drum or chill 23 fixed to the driven member 21, and surrounding the drum, by winding up the coil; but this is likewise an unessential feature in most aspects of my invention, because, of course, an obvious reversal of the several parts would be within the scope of the invention.

The drum or chill 23 is fixed non-rotatively to the driven shaft 21, by means of a key or feather 24. Surrounding the drum and bearing thereon is a driving plate 25, to which one end of the coil 22 is fixed. The driving plate 25 is, in this instance, formed as an integral part of the gear wheel or pulley 20, but this is not essential. The coil 22 is so arranged as to surround that portion of the drum which is not surrounded by the driving plate. When the parts are in the disengaged position (Fig. 1), the coil moves about the drum with a certain amount of clearance. That part of the friction coil 22 which is connected to the driving plate 25 is called the head of the coil, and this so-called head, which is indicated generally at 26, is interlocked with the driving plate in any appropriate manner. By preference, the head of the coil carries a lug which fits into a notch of the driving plate, but as this means of connection is well-known in the art, I have not considered it necessary to illustrate it in detail. The opposite end or tail of the coil is indicated at 27, in Fig. 2, and the last convolution at the free end portion of the coil, which is indicated at 28, is adapted to act as an armature of an electromagnet 29 attached to or forming part of the driven member 23. In the form shown, the magnet 29 is formed of a ring or annulus of soft dynamo steel bolted to the end of the drum 23 by bolts 30 passing through lugs 31 on the ring. On the inner face of the ring, which is of greater diameter than the drum, and extends beyond the same, the ring is provided with a groove in which is fitted a ring-like magnet coil 32. The inner diameter of the magnet coil is preferably somewhat greater than the inner diameter of the end convolution 28 of the coil, whereas the outer diameter of the magnet coil is preferably smaller than the outer diameter of said end convolution. The magnet formed by the magnet plate 29 and coil 32 is located opposite the end convolution 28, so that when the magnet is energized, it will exert an even pull on the end convolution 28 in a direction axially of the friction coil. Means are provided, however, for preventing contact of the end convolution or winding 28 with the magnet proper. In the example shown, an annular plate 33 of brass, or other non-magnetic material, is interposed between the magnet and the coil, and I prefer to attach this brass plate to the magnet by means such as screws 34, although in some cases, said plate, or its equivalent, might be attached to the armature member rather than to the magnet member. In the form shown, this non-magnetic plate covers the whole portion of the magnet which is adjacent to the end convolution of the friction coil, and as it prevents contact of the end convolution 28 with any part of the magnet proper, it serves to eliminate any tendency of the magnet and armature to cling together by residual magnetism when the current is cut off.

Insulated conducting wires 35, 36 pass from the terminals of the magnet coil 32, through suitable openings 37, 38 in the magnet plate 29, and are connected with binding posts 39, 40. These binding posts are mounted on small plates 41, 42 of insulating material screwed to the magnet plate 29. From the binding posts 39, 40 insulated conducting wires 43, 44 pass into the space within the drum 23, preferably through suitable grooves or conduits 45, 46, which may be conveniently formed at the inner surface of the drum. The conducting wire 43 is connected with an insulated slip ring 47 fixed to that end of the drum which is opposite the magnet plate, while the conducting wire 44 is connected to an insulated slip ring 48 mounted adjacent the ring 47. Brushes 49, 50 respectively fixed on the machine frame at some suitable point maintain permanent contact with the slip rings 47, 48 respectively as the drum is rotated, and one of said brushes is connected with one pole of a generator G, or other source of current, and the other brush is connected with the other pole. One of the leads is provided with a switch 51 so that the circuit can be closed and opened, whereby the magnet is energized and deënergized in an obvious manner.

The end convolution 28 of the friction coil, which acts as an armature coöperating with the magnet, can either be made from the same kind of steel from which the friction coils are usually made, or it can be made of a soft dynamo steel similar to that which is preferably used in the construction of the magnet. In practice, the friction coil 22 is bent up from a bar formed of a plurality of sections of varying diameters, welded together end to end, and in the particular form shown approximately the last two convolutions are intended to be constructed of soft dynamo steel. The weld between this section of the coil and the adjacent section is indicated by the dotted line 52 in Fig. 3.

Of course that face of the end convolution 28 which opposes the magnet 29, 32 should be spaced from the magnet uniformly substantially throughout the periphery of said convolution and said magnet. The face of the magnet disposed toward the coil lies in a single vertical plane, and therefore that face of the end convolution 28 which opposes the magnet lies substantially in a single vertical plane. In other words, in the particular form shown, the magnet has a flat working face, and the end convolution of the coil has a flat coöperating face spaced equidistantly from the magnet face at substantially all points. This end may be attained by making the end convolution of the coil of the special shape shown in Fig. 3. In other words, the width of the end convolution is so varied at different points as to preserve an equidistant spacing of the coil with respect to the magnet substantially throughout the periphery of the coil and magnet, although it is necessary to leave a small gap 53 at the extremity of the coil in order to allow for the contraction thereof.

The friction coil 22 is preferably inclosed by suitable casing or shell 54 bolted to the driving plate 25, and extending almost into contact with the non-magnetic ring or spacer 33, as shown in Fig. 1.

The operation of the clutch is substantially as follows: In Fig. 1, the switch 51 is open and the clutch is in the "off" position, the wheel or pulley 20 being continuously rotated without movement of the driven shaft 21. When it is desired to drive the shaft 21, the switch is closed. It will be understood that at this time the magnet is stationary, while the friction coil rotates freely about the drum. In practice, the end convolution 28 of the friction coil will usually rotate in light contact with the brass plate 33. As soon as the magnet is energized, however, the end convolution 28 of the friction coil is strongly attracted toward the magnet, and is tightly clamped against the brass plate 33, which, in the case illustrated, is fixed relative to the magnet. Thus the free end portion of the friction coil is locked or fixed relative to the stationary or slower moving magnet. As a consequence the tail 27 of the friction coil is dragged back or retarded relative to the main part of the friction coil, and the coil is thereby wound or tightened on the drum 23, so as to drive the driven shaft. As soon as the tail 27 is fixed relative to the magnet by the energization of the latter, the coil begins to wind up from the free extremity 27, and the torsion thus produced in the end convolution 28 is sufficient to cause it to grip the drum 23 frictionally, just as is the case with the other convolutions of the friction coil. This is an important feature, because as a result the end convolution not only acts as an armature, but also fulfils its function as a part of the friction coil in increasing the frictional grip on the drum and augmenting the frictional engagement between the drum and the coil as a whole. It may be stated at this point that the end convolution 28 of the rfiction coil is not the only convolution which is acted upon directly by the magnet, because as the magnet is substantially concentric with and of approximately the same diameter as the friction coil as a whole, the magnetic force exerts an axial pull on several of the coil convolutions which are adjacent the magnet, and in this sense the armature consists, strictly speaking, of more than one convolution of the coil. When the switch 51 is opened, the end convolution 28 and any others which are under the direct influence of the magnetic pull, are immediately released from their fixed position relative to the magnet. The brass plate 33, or its equivalent, interposed between the convolution 28 and the magnet, prevents these parts from adhering to each other by residual magnetism when the current has been cut off. Of course, the clutch should be so designed, and such current provided that the brass plate, or its equivalent, will not interfere in any appreciable degree with the magnetic attraction of the armature when the current is turned on, while on the other hand, its neutralizing action will be sufficient to overcome the inconvenient effects of residual magnetism when the current is turned off. As previously indicated, I do not limit myself to a plate interposed between the armature and magnet for this purpose, as other means for limiting the movement of the armature toward the magnet, or magnet toward the armature, and of preventing full metal to metal contact between these parts, may be employed. This insures a quick release of the friction coil when the current is turned off, so that it will immediately spring back out of engagement with the drum 23, and permit the driven shaft to come to rest.

By my improvements, the construction of the clutch is very much simplified by using a part of the friction coil as an armature for the electromagnet without employing a special armature plate locked to the tail of the coil. So far as this particular feature of my invention is concerned, it is not always necessary to prevent the coil from making contact with the magnet. On the other hand, in those aspects of the invention which particularly concern the means for preventing the gripping together of the magnet and armature by residual magnetism, it is not always necessary to employ a friction coil in which the convolution at the free end acts as an armature. Various changes in the details of the construction may be adopted within the scope of the invention as defined in the claims.

It will be noted from the foregoing description that the armature member of the friction coil is permanently spaced from the magnet proper by means of the brass plate 33, or its equivalent. For all practical purposes, the armature member occupies substantially the same position axially of the clutch with reference to the electromagnet when the magnet is energized, as it does when the magnet is deënergized. In other words, it is not essential that the armature be in contact with the magnet at one time, and that it be kept out of contact with the magnet at another time, as in some prior constructions.

I do not claim broadly herein the combination of a driving member, a driven member, one of said members comprising a drum, a friction coil attached to the other member and embracing said drum, a casing for the clutch, including an end plate, and a magnet structure for locking the free end of the friction coil to said drum, including said end plate as a part thereof, as claimed in my application Serial No. 861,825. Furthermore, I do not claim broadly herein the combination of driving and driven members, one of said members comprising a drum, a friction coil attached to the other member and embracing said drum, an end plate fixed to said drum, and electromagnetic means for clamping said friction coil to said end plate, as claimed in my application Serial No. 84,468.

What I claim is:

1. A clutch having a driving part, a driven part, a friction coil for coupling said parts together having a plurality of convolutions, and an electromagnet for operating said friction coil, located adjacent one of the coil convolutions and adapted to act thereon in a direction parallel to the axis of the friction coil; substantially as described.

2. In a clutch, the combination of a driving part, a driven part, a friction coil for coupling said parts together, having a plurality of convolutions, and an electromagnet for operating said friction coil adapted to act directly on one of said convolutions throughout substantially the entire circumference or periphery of such convolution; substantially as described.

3. In a clutch, the combination of a driving part, a driven part, a helical friction coil for coupling said parts together, having one end attached to one of the clutch parts and provided at the opposite end with a free convolution, and an electromagnet for clamping the friction coil to the other clutch part, located adjacent the free end convolution and adapted to act directly thereon in a direction parallel to the axis of the friction coil, substantially throughout the circumference or periphery of the coil; substantially as described.

4. A clutch having a driving part, a driven part, an electromagnet, and a friction coil carried by the driving part for coupling said parts together, located concentrically with respect to said electromagnet, and having an end convolution serving as an armature therefor; substantially as described.

5. A clutch having a driving part, a driven part, an electromagnet having a ring-like coil, and a friction coil for coupling together the driving and driven parts, concentric with the magnet coil and serving as the sole armature for the magnet; substantially as described.

6. A clutch having a driving part, a driven part, an electromagnet carried by the driven part and having a ring-like coil, a friction coil for coupling together the driving and driven parts, carried by the driving part and surrounding the driven part, said friction coil substantially concentric with said electromagnet, and serving as the sole armature therefor; substantially as described.

7. A clutch having a driving part, a driven part, an electromagnet, and a coil for coupling said parts together, having a convolution serving as an armature for said electromagnet, and spaced equidistantly from said electromagnet substantially throughout the periphery of said convolution; substantially as described.

8. A clutch having a driving part, a driven part, an electromagnet having a working face in a plane substantially perpendicular to the axis of rotation of said parts, and a coil for coupling together said driving and driven parts, having an end convolution acting as an armature for said electromagnet, said end convolution provided with a working face in a plane parallel to the working face of said electromagnet; substantially as described.

9. A clutch having a driving part, a driven part, an electromagnet having a substantially flat working face located in a plane approximately perpendicular to the axis of rotation of said driving and driven parts, and a friction coil for coupling together said driving and driven parts, having an integral end convolution acting as an armature for said electromagnet, said convolution provided with a flat working face opposing the working face of said magnet; substantially as described.

10. In a coil clutch, the combination of driving and driven members, one of said members comprising a drum, a friction coil attached to the other member and embracing said drum, an end member fixed to said drum, a magnet carried by said end member, and means for clamping the friction coil to said end member when the magnet is energized; substantially as described.

11. A clutch having a driving part, a driven part, an electromagnet comprising a metal plate or frame, and a magnet coil carried thereby, an armature member for said electromagnet, a coil operated by said armature member to couple together said driving and driven parts, and means preventing contact of said armature member with said electromagnet when the magnet is energized; substantially as described.

12. A clutch having a driving part, a driven part, an electromagnet comprising a metal plate or frame, and a magnet coil carried thereby, an armature member for said electromagnet, a friction coil operated by said armature member to couple together said driving and driven parts, and means interposed between said electromagnet and said armature member for preventing metal to metal contact of said parts when the magnet is energized; substantially as described.

13. A clutch having a driving part, a driven part, an electromagnet, a friction coil for coupling together said driving and driven parts, an armature for said electromagnet associated with said friction coil, and means permanently spacing said armature member from said electromagnet to avoid the gripping together of said parts by residual magnetism; substantially as described.

14. A clutch having a driving part, a driven part, an electromagnet, a friction coil for coupling together said driving and driven parts, an armature for said electromagnet associated with said friction coil, and a member of non-magnetic material interposed between said armature and said magnet to prevent metal to metal contact of said parts, when the magnet is energized, whereby said parts are prevented from cohering when the current has been turned off; substantially as described.

15. A clutch having a driving part, a driven part, an electromagnet a friction coil for coupling said parts together, having an integral end convolution serving as an armature for said electromagnet, and means interposed between said end convolution and said magnet for preventing metal to metal contact of said armature and magnet when the latter is energized; substantially as described.

16. A clutch having a driving part, a driven part, an electromagnet carried by the driven part, and comprising a magnet plate and a ring-like magnet coil carried thereby, a friction coil for coupling together said driving and driven parts, carried by said driving part and surrounding the driven part, said friction coil being substantially concentric with said magnet coil and serving as an armature, and a non-magnetic plate preventing metal to metal contact of the friction coil and magnet when the latter is energized; substantially as described.

17. A clutch having a driving part, a driven part, an electromaget, a friction coil for coupling together said driving and driven parts, and an armature for said electromagnet connected with said friction coil, and permanently spaced from said electomagnet; substantially as described.

18. In a coil clutch, the combination of driving and driven members, one of said members comprising a drum, a friction coil attached to the other member and embracing said drum, an end plate fixed to said drum, a magnet carried by the end plate, and means for clamping the friction coil to the end plate when the magnet is energized; substantially as described.

19. In a coil clutch, the combination of driving and driven members, one of said members comprising a drum, a friction coil attached to the other member and embracing said drum, an end plate fixed to the drum, and an annular electromagnet carried by the end plate substantially in line with the friction coil; substantially as described.

20. In a coil clutch, the combination of driving and driven members, a friction coil attached at one end to one of said members and embracing the other member, and an annular electromagnet carried by such other member in line with said friction coil and of substantially the same diameter as said coil; substantially as described.

21. In a clutch, a driving part, a driven part, an electromagnet, and a friction coil for coupling said driving and driven parts together, having a plurality of convolutions, one of said convolutions being opposed to the magnet to serve as an armature therefor, and at least one more convolution being under the direct influence of the magnet; substantially as described.

22. A clutch having a driving part, a driven part, an electromagnet having a working face substantially perpendicular to the axis of rotation of said parts, and a friction coil for coupling together said driving and driven parts, provided with a squared off end convolution opposing said electromagnet, and in close proximity thereto; substantially as described.

23. In a coil clutch, the combination of two clutch members, a friction coil carried by one of said members and adapted to engage the other member, and an annular electromagnet fixed with respect to such other member and adapted to exert a magnetic pull on a plurality of the coil convolutions; substantially as described.

24. In a coil clutch, the combination of two main clutch members, a friction coil attached to one of said members and adapted to engage the other member, said coil having a plurality of convolutions, and an annular magnet carried by such other adjacent one end of the friction coil and substantially in line with said coil; said magnet having a magnetic field including a plurality of the coil convolutions; substantially as described.

25. In a clutch, driving and driven members, a friction coil for coupling said members together, and an electromagnet for operating said coil adapted to act on the latter in an axial direction by direct magnetic action on a plurality of the coil convolutions; substantially as described.

26. In a coil clutch, the combination of a driving member, a driven member, one of said members comprising a drum, a friction coil surrounding the drum and attached to the other member, a plate secured to the end of the drum, and an annular electromagnet carried by the plate in line with the friction coil and adapted to exert a magnetic pull on a plurality of the coil convolutions in a direction parallel to the axis of the drum and coil; substantially as described.

27. In a coil clutch, the combination of two clutch members, one of said members comprising a drum, a helical friction coil attached at one end to the other clutch member and embracing said drum, and an electromagnet arranged to engage said friction coil with said drum by direct magnetic pull on a plurality of the coil convolutions in a direction parallel to the axis of the drum; substantially as described.

28. In a clutch, the combination of a driving member, a driven member, one of said members comprising a drum, a friction coil attached to the other member and embracing said drum, an auxiliary clutch member carried by the drum, a second auxiliary clutch member at the free end of the friction coil, and an annular electromagnet substantially in line with said friction coil for interengaging the auxiliary clutch members; substantially as described.

29. In a coil clutch, the combination of a driving member, a driven member, one of said members comprising a drum or cylinder, a friction coil attached to the other member and embracing said drum, or cylinder, a casing for the clutch including an end plate, and an annular electromagnet mounted on said end plate and adapted to exert a magnetic pull on the end convolution of the friction coil in a direction parallel to the axis of said coil; substantially as described.

30. In a coil clutch, the combination of a driving member, a driven member, one of said members comprising a drum, a helical friction coil surrounding said drum and attached to the other member, and an annular magnet structure located at the end of the friction coil and substantially in line with said friction coil for retarding the free end of the coil; substantially as described.

31. In a coil clutch, the combination of driving and driven members, one of said members comprising a drum, a friction coil surrounding the drum, means for securing one end of the friction coil to the other clutch member, an annular electromagnet carried by the clutch member surrounded by the friction coil, an annular member on the free end of the friction coil serving as an armature for said magnet, and movable toward and away from said magnet in a direction parallel with the axis of the friction coil, and means guiding said annular armature member for turning movement relative to the magnet; substantially as described.

32. In a coil clutch, the combination of driving and driven members, one of which comprises a drum, a friction coil attached to the other member, and embracing said drum, a member fixed to said said drum in line with the free end of said friction coil, and a magnet carried by said member for clamping the friction coil to said last-named member; substantially as described.

33. In a coil clutch, the combination of driving and driven members, a helical friction coil attached at one end to one of said members and embracing the other member, a magnet-supporting member fixed to such other member adjacent the free end of said coil, and an electro-magnet carried by said magnet-supporting member for coupling the driving and driven members by means of said friction coil; substantially as described.

34. In a coil clutch, the combination of driving and driven members, a helical friction coil attached at one end to one of said members and embracing the other member, a plate fixed to such other member and extending at right angles to the axis of the friction coil adjacent the free end of said coil, and an annular electro-magnet carried by said plate for retarding the free end of the friction coil and thereby coupling the driving and driven members; substantially as described.

In witness whereof, I have hereunto set my hand on the 26th day of December, 1914.

CARL F. SCHNUCK.

Witnesses:
OSWALD ULLRICH,
ALBERT B. C. SCHROEDER.